United States Patent
Hung et al.

(10) Patent No.: US 7,236,226 B2
(45) Date of Patent: Jun. 26, 2007

(54) METHOD FOR GENERATING A SLIDE SHOW WITH AUDIO ANALYSIS

(75) Inventors: Chien-Yu Hung, Banciao (TW); Shu-Fang Hsu, Taipei (TW)

(73) Assignee: Ulead Systems, Inc., Taipei (TW)

(*) Notice: Subject to any disclaimer, the term of this patent is extended or adjusted under 35 U.S.C. 154(b) by 303 days.

(21) Appl. No.: 11/034,286

(22) Filed: Jan. 12, 2005

(65) Prior Publication Data

US 2006/0152678 A1 Jul. 13, 2006

(51) Int. Cl.
*G03B 31/00* (2006.01)
*G06F 15/00* (2006.01)
*G06F 17/00* (2006.01)

(52) U.S. Cl. .................. 352/12; 715/500.1; 700/94
(58) Field of Classification Search .............. 352/12, 352/15, 16, 244; 715/500.1; 382/232; 700/94
See application file for complete search history.

(56) References Cited

U.S. PATENT DOCUMENTS

| | | | |
|---|---|---|---|
| 5,146,353 A | 9/1992 | Isoguchi et al. ............ 358/909 |
| 5,951,646 A * | 9/1999 | Brandon ...................... 709/231 |
| 6,639,649 B2 * | 10/2003 | Fredlund et al. .............. 352/12 |
| 2004/0122539 A1 * | 6/2004 | Ainsworth ..................... 700/94 |
| 2004/0205477 A1 | 10/2004 | Lin .......................... 715/500.1 |
| 2005/0182503 A1 * | 8/2005 | Lin et al. ....................... 700/94 |
| 2005/0217462 A1 * | 10/2005 | Thomson et al. ............. 84/612 |
| 2005/0275805 A1 * | 12/2005 | Lin et al. ....................... 352/12 |

OTHER PUBLICATIONS

Handbuch (manual): DiaShow XP, Aquasoft GmbH, 2003, pp. 1-9 and 33, eHB, English translation included.

* cited by examiner

*Primary Examiner*—Rodney Fuller
(74) *Attorney, Agent, or Firm*—Kusner & Jaffe

(57) ABSTRACT

With the method for generating a slide show in harmony with music, the user is able to compose an attractive and interesting slide show by a convenient and simple method. The steps of the method comprises: analyzing audio data to obtain reference points, wherein the reference points include at least one beat point of said audio data; obtaining image effects for images; selecting at least one first level point and at least one second level point from the reference points; and composing a slide show of the images with the image effects in association with the audio data, wherein the image effects are controlled according to the first level point and the displaying of the images is controlled according to the second level point.

17 Claims, 4 Drawing Sheets

METHOD FOR GENERATING A SLIDE SHOW WITH AUDIO ANALYSIS

FIELD OF THE INVENTION

The present invention is related to a method for generating a slide show, especially to a method for generating a slide show with the audio analysis.

BACKGROUND OF THE INVENTION

With the progress of digital image technology, the digital cameras have been more and more popular, and gradually the conventional cameras become outmoded. The pictures could be stored in digital forms as image files, so the user may view the photos through a computer or any other digital device, such as cellular phone, PDA, or even a digital camera. The image data captured by the digital camera is generally transferred to a personal computer and other data processing devices for being further processed, stored, or printed. Therefore, by the digitized function of the digital camera and the data processing ability of the personal computer, the applications of the digital image are more and more popular in the daily life. Moreover, the photographs stored in a personal computer can be processed or added with multimedia effect. Although taken by a conventional camera, the pictures may still be stored as image files through a scanner. Hence, almost all pictures could be treated as digital files. The user therefore could utilize the device with the ability of simple image processing to review the occasions and scenery of the pictures. However, the picture could only capture and preserve still image. Comparing with the video, the picture is boring and dull. Everyone in the picture is still and frozen. Especially there are many friends or relatives in that occasion.

Since viewing still pictures one by one is somewhat boring, and therefore unattractive, there are more and more techniques provided for composing the slide show of plural images. The conventional slide show merely displays the selected images or pictures one by one in an elaborate sequence or just random order. However, the images are "still images" all the same.

Recently, the generation of slide show further introduces the image effects to make the slide show vivid. The main purpose of such slide show is to simulate the movies. However, the movies have progressed from the silent film for quite a long time. The audience would never be satisfied with the movies or the slide show without splendid sound effect. Therefore, what is desired is to apply the audio analysis in the process of composing the slide show.

SUMMARY OF THE INVENTION

In view of aforementioned problems, the present invention therefore provides a method and a storage medium for generating a slide show with fascinating audio effect. With the method and storage medium of the present invention, the user is able to create an attractive slide show of images, and such slide show would be displayed in harmony with the audio data. All the user has to do are merely selecting certain images and audio files, and the computer or processor will finish the remaining steps.

According to one purpose of the present invention, a method for generating a slide show with audio analysis is provided. First, the audio data selected by the user are analyzed to obtain reference points, wherein the reference points include at least one beat point of the audio data. Additionally, the image effects for the provided images are obtained through the image analysis or simply from the predetermined content of the templates. Next, from the obtained reference points, at least one first level point and at least one second level point are selected. Finally, a slide show of the images would be composed with the image effects in association with the audio data. The image effects of the images would alter at the coming of the first level point, and at least one of the images is displayed until the second level point. That is, the first level point is applied to control the image effect, and the second level point is applied as the timing reference to change one image to another.

According to another purpose of the present invention, a computer-readable storage medium having executable instructions for generating a slide show with audio analysis is provided. The slide show is generated by performing the following steps: analyzing audio data to obtain reference points, wherein the reference points include at least one beat point of said audio data; analyzing images to determining image effects; selecting at least one first level point and at least one second level point from the reference points; and composing a slide show of the images with the image effects in association with the audio data, wherein the image effects are controlled according to the first level point and the displaying of the images is controlled according to the second level point.

DETAILED DESCRIPTION OF THE PREFERRED EMBODIMENT

The present invention is described with the preferred embodiments and accompanying drawings. It should be appreciated that all the embodiments are merely used for illustration. Hence, the present invention can also be applied to various embodiments other than the preferred embodiments. Besides, it will be appreciated that various changes can be made without departing from the spirit and scope of the invention and the present invention is therefore not limited to embodiment of the present invention.

Figure 1:
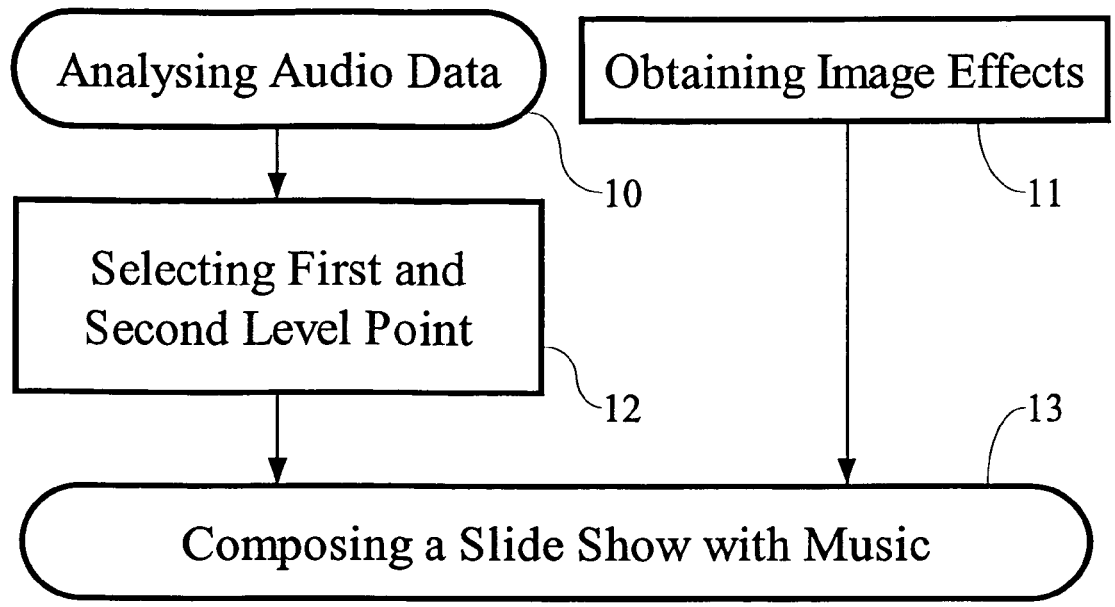
FIG. 1 is a flow chart showing the steps of one embodiment of the slide show generation method.

Referring to FIG. 1, the steps of the slide show generation method are illustrated according to the preferred embodiment of the present invention. This method is preferably executed by the computer, but other electrical devices such as personal digital assistant, digital camera, DV or smart phone may also be applied to perform the method of the present invention. In the beginning, an instruction is input into the device to designate or provide an image and/or audio data. For example, the user may be asked to designate or provide certain images and audio data. According to the preferred embodiment of the present invention, the images could be digital image files, and the audio data could be digital music files, a music CD/DVD, or a cassette tape. It should be appreciated that the sources of image and music are various, and any possible kinds of sources would be included in the embodiments of the present invention.

The selected images would be processed to generate a slide show with attractive image effects, such as the transition effect, the panning effect, the zooming effect, or the blurred effect. It should be appreciated that the above image effects are enumerated for description instead of limitation. The present invention encompasses any possible kind of image effects.

The selected audio data would be played as the background music of the slide show if the audio is substantially synchronic selected. Besides, the slide show would display images in harmony with the music, that is, the image switching and image effects would be carried out according to the characteristics of the audio data, such as the tempo, the beats, or the chord. Therefore, a charming slide show of images in harmony with music would be automatically generated in a convenient and simple way.

After the audio data and images are provided, the computer or processor would perform the audio analysis for the provided audio data to obtain the reference points, as shown in step 10. In accordance with the preferred embodiment of the present invention, the reference points include the beat points of the audio data, and the obtainment of the beat points would be detailed described in the following. The processor may also perform the image analysis for the provided images to determine the image effects, as shown in step 11. It should be noted that the image analysis and the audio analysis are performed independently, and even synchronously. However, certain types of the templates may be selected by a user to replace the step of image analysis. The templates would predetermine a group of image effects, and these image effects would be simply applied into the images with slight analysis or without any analysis. According to the preferred embodiment of the present invention, the image analysis includes the semantic analysis and the non-semantic analysis, such as human face detection and symmetric point detection. The image analysis and image effect determination have been disclosed in U.S. patent application Ser. No. 11/013,811, filed by the identical applicant of the present application, entitled "Method for Generating a Slide Show of an Image," filed on Dec. 16, 2004. This application is incorporated herein for reference. In above application, the method for generating a slide show applies the semantic analysis and non-semantic analysis to control the panning and zooming effects of images.

After the audio analysis is completed, the processor would select the first level points and the second level points from the reference points, as shown in step 12. The first level points are used for controlling the image effects. For examples, the first level points are taken as the initial point and end point of specific image effect, or as the change point between adjacent image effects. The second level points are introduced for changing one image to another, that is, one image would be displayed until the arrival of certain second level point, and the next image would be displayed right after that second level point. In one embodiment of the present invention, the second level points are selected from the first level points. Namely, any second level point should belong to the first level points.

To select the first level points from the reference points, the tempo value of the background music is obtained from the audio data firstly. In one embodiment of the present invention, the vocal signals are eliminated from the audio data first. The remaining portion would undergo similar audio analysis mentioned above to obtain the reference points of background music. With these reference points of background music, the tempo value could be calculated according to the number and density of the points. Since the tempo is usually changeable during the entire background music, the middle portion of the music is usually taken as the sample to obtain the middle tempo value. In other embodiment, the music may be divided into plural portions, and the mean tempo value would be adopted. The tempo value represents or refers to the "speed" of the music, and therefore is an appropriate criterion for the altering frequency of image effects. For example, as the background music of the audio data has higher tempo value, the changing frequency of the image effects would preferably be greater. The selection of the reference points is made according to the "chord change probability." Usually, as the chord change probability of certain period is greater than zero, one point in that period would be taken as a reference point. When the first level points are selected from the reference points, it is preferably to raise the selection threshold of the chord change probability, namely set the threshold greater than zero. The greater the tempo value is, the more the first level points needed. The degree of the threshold increase bases on the tempo value. Preferably, the greater the tempo value is, the lower the threshold would be, and vise versa.

After the first level points are determined, the second level points would be selected from them. The second level points control the displaying and changing of images, so the selection of second level points should also base on the tempo value. That is, the tempo value would determine the preferred time interval threshold, and the threshold represents the smallest time interval between adjacent second level points. Thus, the image changing frequency would base on the tempo value. Preferably, the greater the tempo value is, the smaller the time interval threshold would be, and vice versa.

Figure 4:
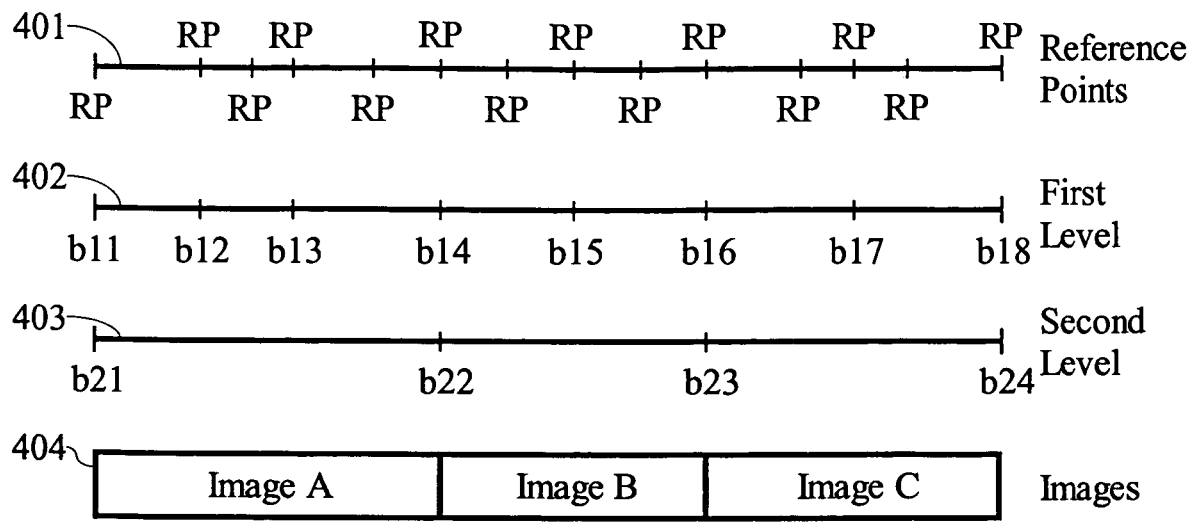
FIG. 4 is a timeline diagram showing the relation between the reference points, the first and second level points, and the displaying of images.

According to one embodiment of the present invention, the relation of the reference points, the first level points, the second level points, and the displaying of images is illustrated in FIG. 4. The timeline 401 is marked with all of the reference points RPs, and the timeline 402 is marked with the first level points b11-b18 selected from the RPs. The timeline 403 is divided into three sections by second level points b21-b24, and the strip 404 is also divided into three potions corresponding to the timeline 403. The portions of strip 404 represent the display durations of the images, which are Image A, Image B, and Image C. It should be noted that the reference points are mainly comprised of beat points obtained from the audio data analysis, but other types of points may also be included, such as the initial point (b11, b21) and end point (b18, b24) of the music of the audio data. Besides, the timelines 401-403 and strip 404 have equal length and align at both ends.

Finally, in step 13, the slide show with image effects in harmony with the music is composed. The image effects therein are controlled according to the first level points, and the displaying of images are controlled based on the second level points. In other words, the image effects may alter at certain first level point, and the displaying of image would switch one to another at certain second level point. Hence, a slide show of images could perfectly harmonize with the music of the audio data.

Figure 2:
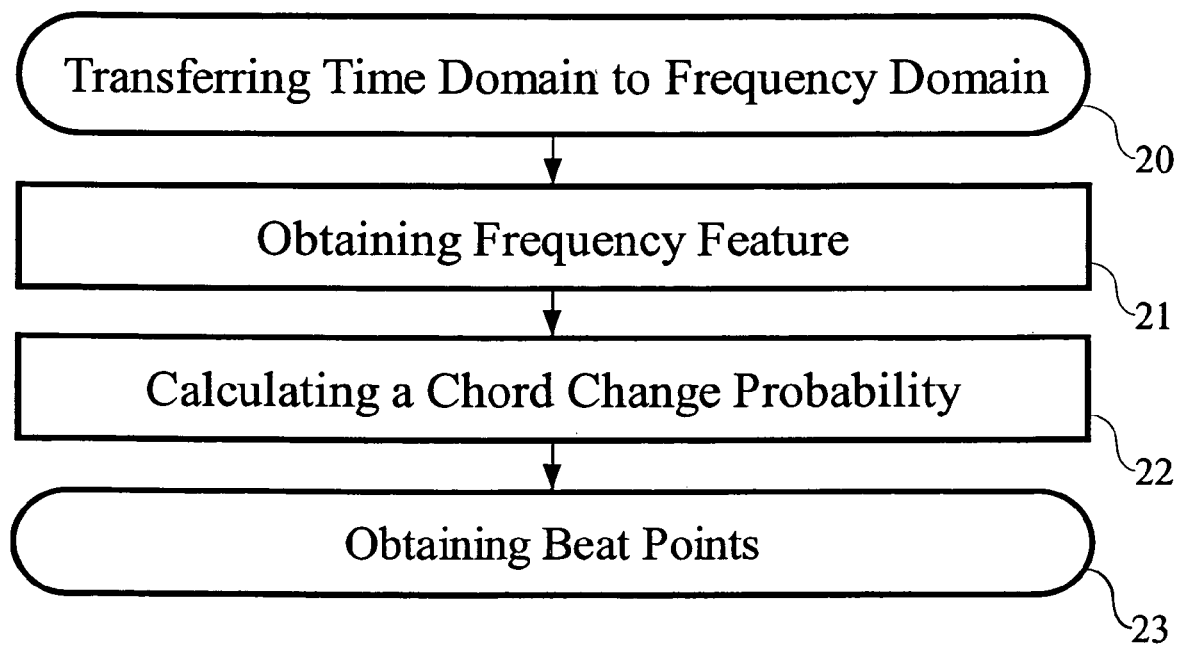
FIG. 2 is a flow chart showing the procedure of one embodiment of the audio data analysis.

In light of one embodiment of the present invention, the detailed procedure of audio analysis is illustrated in FIG. 2. To analysis the audio data, the spectrogram should be found.

Each segment of audio signal is changed to frequency domain by using the Fast Fourier Transform (FFT). That is, the wave features of time domain is transferred to the energy features of frequency domain, as shown in step 20. Next, in step 21, the frequency feature would be obtained. Since the energy values in spectrogram are measured in dB, it is required to convert the complex values, namely FFT(source data) in Formula 1, into dB form. The Formula 1 is preferably applied herein.

$$\text{Energy value}_{(dB)} = 20 \times \log \left[ sq(\text{FFT}(\text{source data})) \right] \quad \text{Formula 1}$$

Subsequently, the energy values would be divided into plural sub-bands according to different frequency areas. The data of these sub-bands are sliced into a predetermined time period, and the dominant frequency of each period is detected. The dominant frequency is determined according to energy values of every sub-band. Consequently, the frequency feature is obtained.

With the frequency feature, the chord change probability could be calculated by comparing the dominant frequencies of adjacent periods, as shown in step 22. Finally, in step 23, the beat points of the audio data are obtained according to the chord change probabilities. For example, as the chord change probability of certain period is greater than zero, one point in that period would be taken as a beat point.

Figure 3:
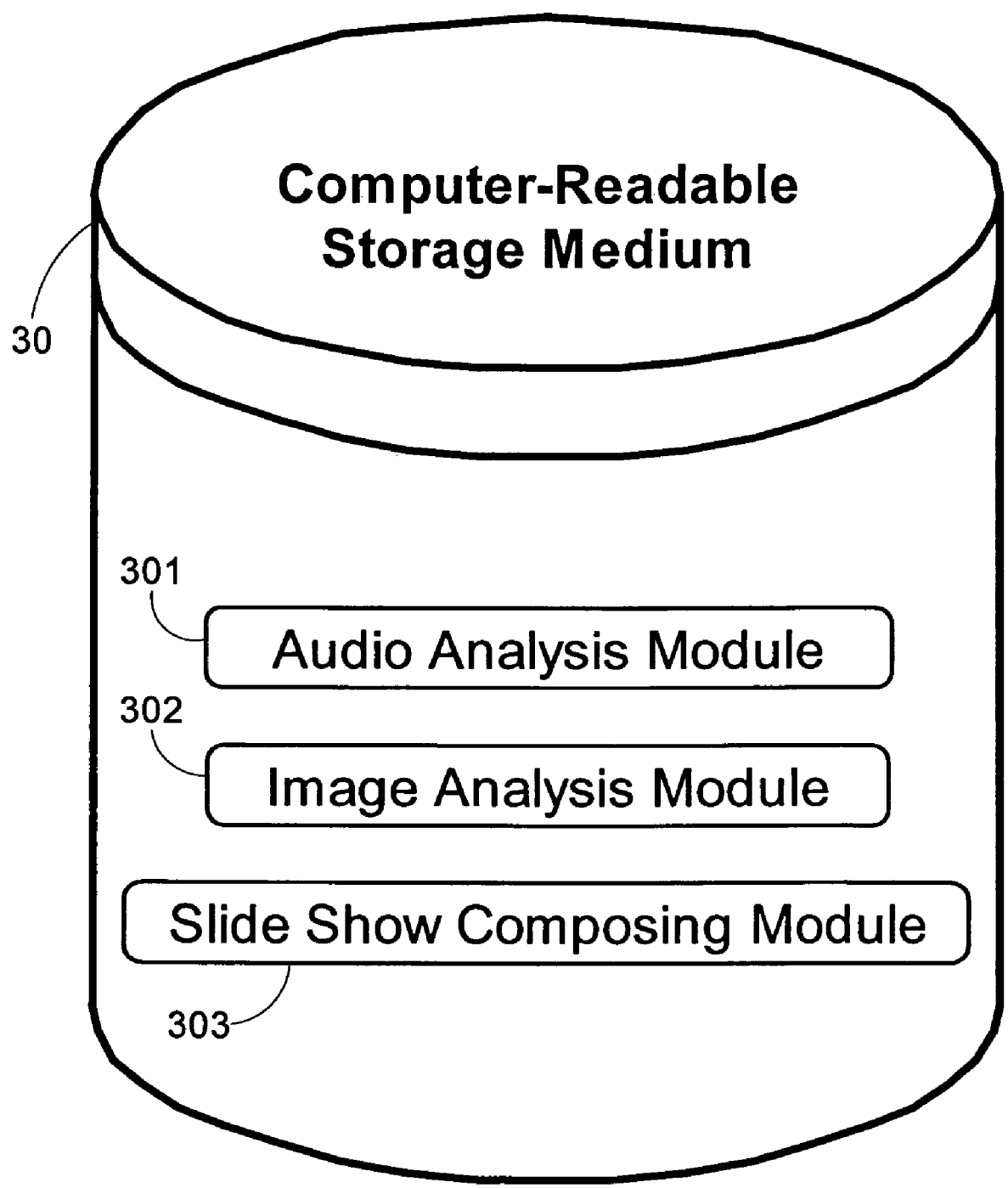
FIG. 3 is a computer-readable storage medium according to one embodiment of the present invention.

According to another aspect of the present invention, the present invention provides a computer-readable storage medium for generating a slide show with audio analysis. FIG. 3 shows the preferred embodiment of the storage medium. The storage medium 30 comprises three modules, which are audio analysis module 301, image analysis module 302, and slide show composing module 303. In accordance of one embodiment, the module may be certain type of software or a list of instructions. However, the module could also be implemented by hardware, such as a chipset or a single-purpose processor. Audio analysis module 301 is applied to analyze the audio data provided or designed by the user, and the reference points including beat points could therefore be obtained. The embodiment of analysis procedure may refer to FIG. 2 and its descriptions. Besides, audio analysis module 301 would select some reference points as the first level points, and further select certain first level points as the second level points. The first and second level points are used to control the displaying of images and the image effects, and the descriptions of first and second level point selection are set forth above.

Image analysis module 302 is used to analyze the content of the images in order to determine the image effects. The types of image analysis may include human face detection and symmetric point detection. Slide show composing module 303 would compose a slide show according to the analytic results of audio analysis module 301 and image analysis module 302.

The types of the storage medium 30 may include the CD/DVD, the Blu-ray disc, the floppy disc, the hard disc, flash drive or the memory. It should be appreciated that the storage medium of the present invention could be any possible means with the ability of keeping digital data, and the enumerated types are cited merely for illustration instead of limitation.

Figure 5:
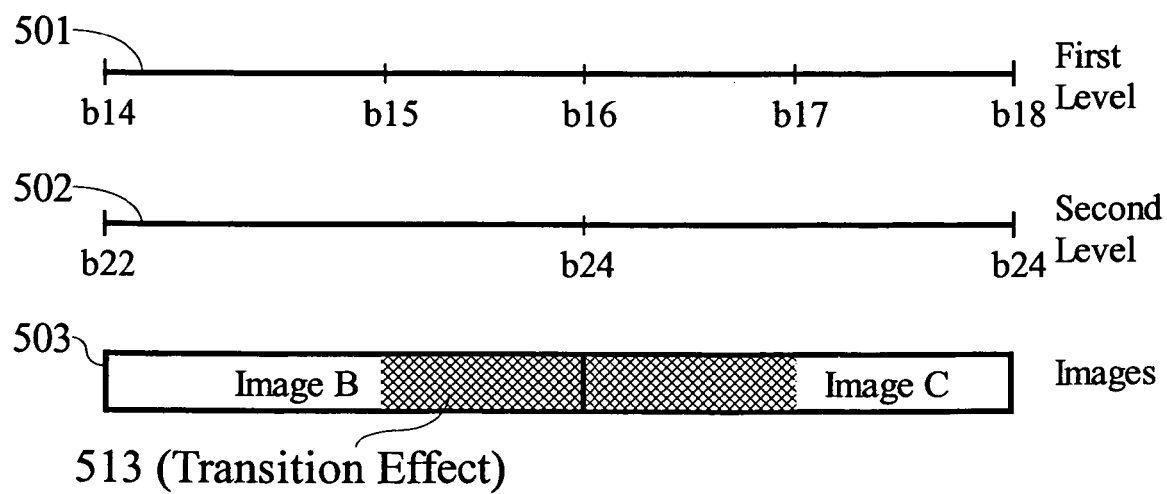
FIG. 5 is a timeline diagram showing the relation between the transition effect and the first and second level points.

FIG. 5 shows one embodiment of the relation of transition effect and the second level points. To change one image to another, the transition effects are often applied. In FIG. 5, the timeline 502 is divided into two sections, which respectively represent the display duration of Image B or Image C. Between these two images, the transition effects are used. In timeline 501, the first level point b15 is placed between b14 (b22) and b16 (b24), and another first level point b17 is placed between b16 (b24) and b18 (b24). The first level points b15 and b17 may be adopted as the control points of the transition effect. Strip 503 represents the displaying durations of the images and is mainly divided into two portions, which respectively stand for Image B and Image C. There is a marked portion 513 within the strip 503, and the marked portion 513 shows the duration of the transition effect. As we can see, the marked portion 513 is aligned with the first level points b15 and b17. That is, the transition effect starts at the point b15 and ends at the point b17.

Figure 6:
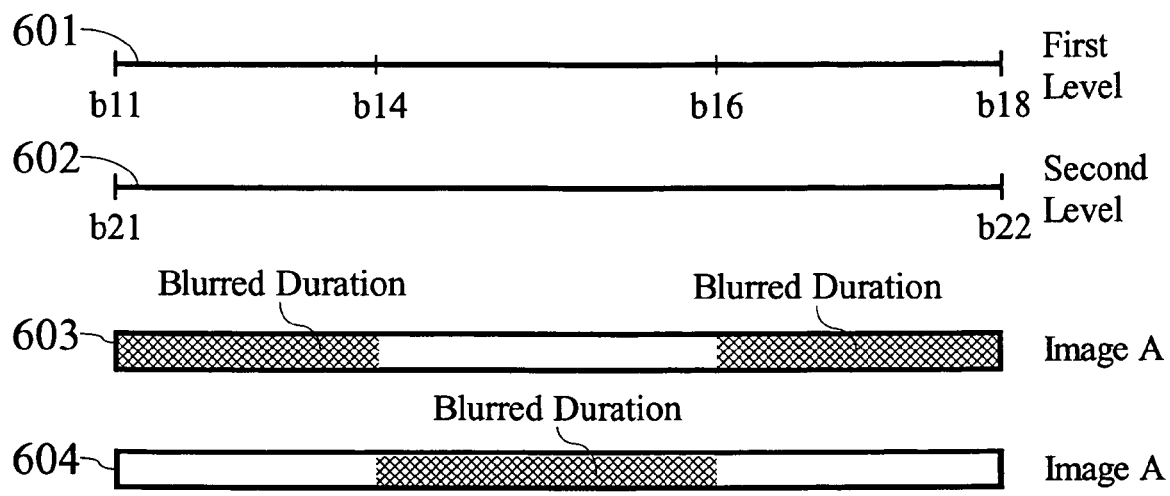
FIG. 6 is a timeline diagram showing the relation between the blur effect and the first and second level points.

FIG. 6 shows one embodiment of the relation of blurred effect and the second level points. The timeline 602 is not cut apart, i.e., Image A would be displayed throughout the duration from b21 to b22. However, the timeline 601 is divided into three sections by first level points b14 and b16. Therefore, in the displaying duration of Image A, there exist two firs level points. The first level points b14 and b16 may be used to control the image effect during the displaying of Image A. In the embodiment shown in FIG. 6, the blurred effect is adopted, and the controlling thereof depends on first level points b14 and b16. FIG. 6 presents two examples of the blurred effect. According to strip 603, Image A is displayed from obscurely to clearly, and then from clearly to obscurely. However, according to trip 604, the display sequence of Image A is clear-blurred-clear. It should be noted that the above types of blurred effect controlling are illustrated for exemplification instead of limitation. The present invention would encompass all other possible controlling types.

Figure 7:
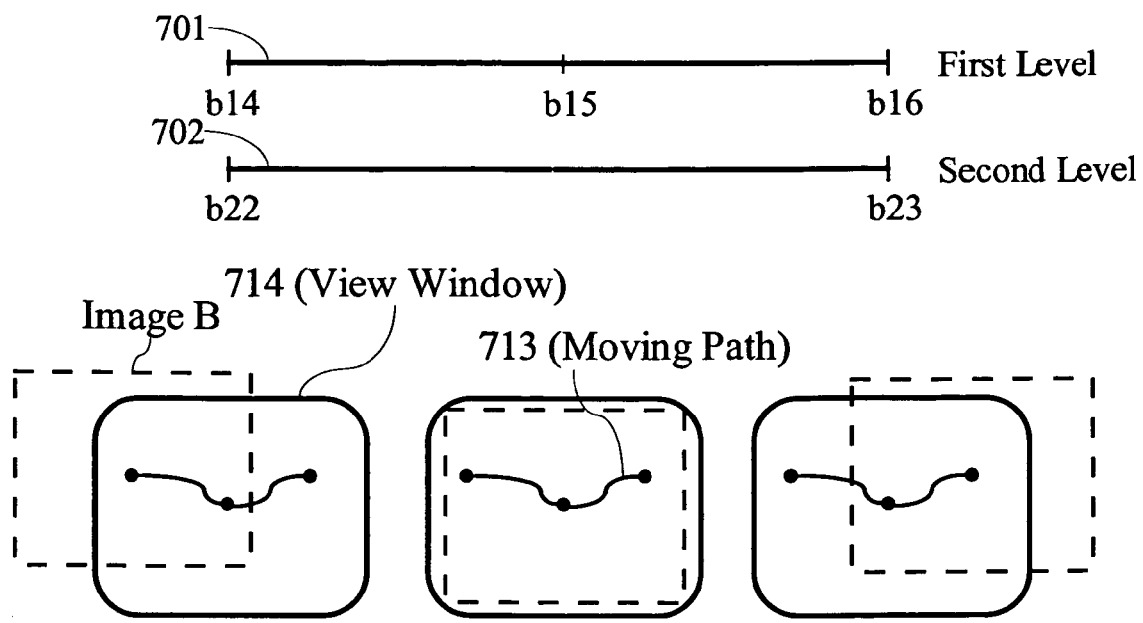
FIG. 7 is a timeline diagram showing the relation between the pan effect and the first and second level points.

FIG. 7 shows one embodiment of the relation of panning effect and the second level points. During the displaying of Image B, there is one first level point b15. After analyzing the images and the audio data, the moving path 713 would be determined. Moving path is the moving track of the focus of Image B. However, the focus may still be replaced with the point within certain semantic region, such as a human face, in Image B. In moving path 713, there are three points, and the middle point is aligned with the first level point b15. As the focus of Image B move to the middle point, Image B is preferably centered in the view window 714. That is, as the arrival of first level point b15, Image B is completely displayed. After that, Image B would be continuously panned along the moving path 713.

In conclusion, with the method and storage medium provided by the present invention, the user is able to generate a slide show in harmony with beautiful music. The image effects and image switching would correspond perfectly to the temp and chord of the audio data. Besides, all the user has to do are merely selecting or providing images and audio data, and the computer or processor then would finish the rest work. Hence, for the user, the present invention indeed discloses a simple and convenient way to generating a attractive slide show in harmony with lovely background music.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

We claim:

1. A method for generating a slide show with audio analysis, comprising:

analyzing audio data to obtain reference points, wherein said reference points include a beat point of said audio data;

obtaining at least one image effect for at least one image;

selecting at least one first level point from said beat points;

selecting at least one second level point from said first level point; and composing a slide show of said image with said image effect in association with said audio data, wherein said image effect is controlled according to said first level point and the displaying of said image is controlled according to said second level point.

2. The method as set forth in claim 1, wherein the analysis of said audio data comprises:

transferring wave features of a time domain to energy features of a frequency domain and obtaining energy values;

dividing said energy values into plural sub-bands;

calculating a chord change probability of each period according to a dominant frequency of adjacent period of said period, wherein the length of said period is predetermined; and obtaining said beat point according to said chord change probability.

3. The method as set forth in claim 2, wherein said dominant frequency is determined according to energy values of every said sub-band.

4. The method as set forth in claim 1, wherein said second level point is selected from said first kvel point according to a tempo value, and said tempo value is acquired by performing a background music analysis of said audio data.

5. The method as set forth in claim 1, wherein said first level point is selected according to a tempo value, and said tempo value is acquired by performing a background music analysis of said audio data.

6. The method as set forth in claim 1, wherein said image effect include a transition effect, a panning effect, a zooming effect, or a blurred effect.

7. The method as set forth in claim 1, wherein said reference points further include a start point and an end point of said audio data.

8. The method as set forth in claim 1, wherein said image effect is predetermined in a template or obtained by an image analysis.

9. A computer-readable storage medium having executable instructions for generating a slide show with audio analysis by performing the following, comprising:

analyzing audio data to obtain reference points, wherein said reference points include a beat point of said audio data;

obtaining at least one image effect for at least one image;

selecting at least one first level point from said beat points;

selecting at least one second level point from said first level point; and composing a slide show of said image with said image effect in association with said audio data, wherein said image effect is controlled according to said first level point and the displaying of said images is controlled according to said second level point.

10. The machine-readable storage medium as set forth in claim 9, wherein the analysis of said audio data comprises:

transferring wave features of a time domain to energy features of a frequency domain and obtaining energy values;

dividing said energy values into plural sub-bands;

calculating a chord change probability of each period according to a dominant frequency of adjacent period of said period, wherein the length of said period is predetermined; and obtaining said beat point according to said chord change probability.

11. The machine-readable storage medium as set forth in claim 10, wherein said dominant frequency is determined according to energy values of every said sub-band.

12. The machine-readable storage medium as set forth in claim 9, wherein said second level point is selected from said first level point according to a tempo value, and said tempo value is acquired by performing a background music analysis of said audio data.

13. The machine-readable storage medium as set forth in claim 9, wherein said first level point is selected according to a tempo value, and said tempo value is acquired by performing a background music analysis of said audio data.

14. The machine-readable storage medium as set forth in claim 9, wherein said image effect is predetermined in a template or obtained by an image analysis.

15. The machine-readable storage medium as set forth in claim 9, wherein said image effect include a transition effect, a panning effect, a zooming effect, or a blurred effect.

16. The machine-readable storage medium as set forth in claim 9, wherein said reference points further include a start point and an end point of said audio data.

17. The machine-readable storage medium as set forth in claim 9, wherein said storage medium includes a CD, a DVD, a Blu-ray disc, a floppy disc, a hard disc, or memory.

* * * * *